Patented Aug. 4, 1925.

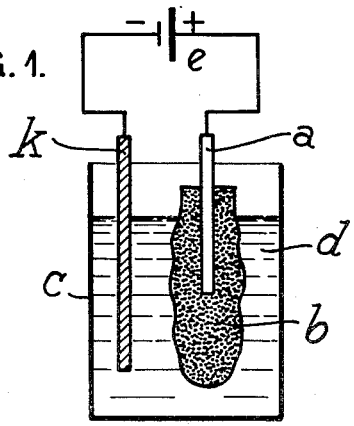
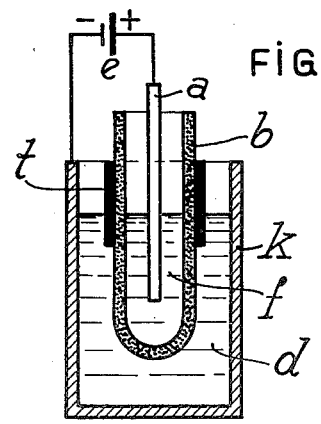
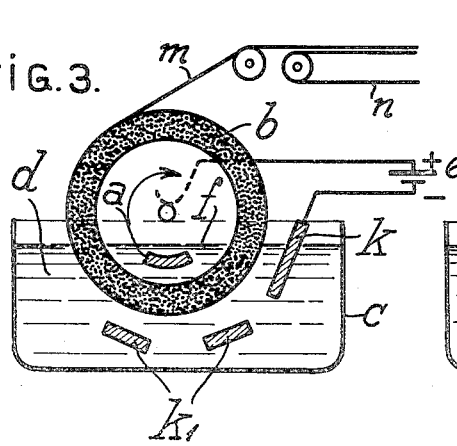
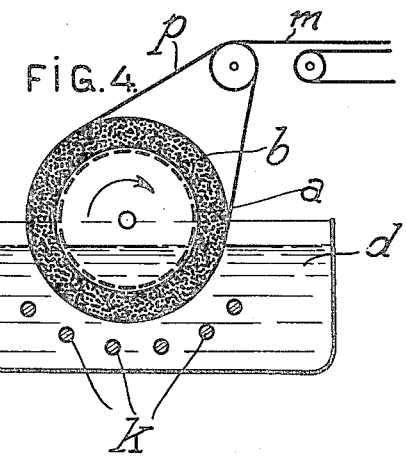
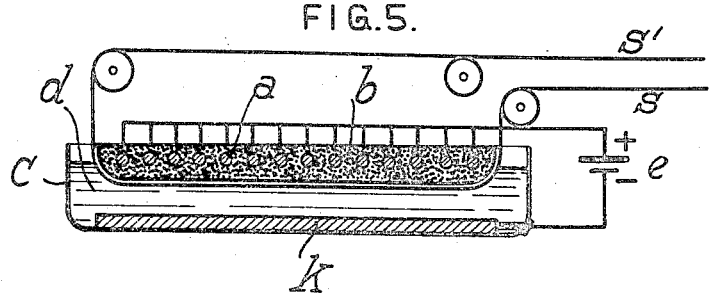

1,548,689

UNITED STATES PATENT OFFICE.

PAUL KLEIN, OF BUDAPEST, HUNGARY, ASSIGNOR TO THE ANODE RUBBER COMPANY LIMITED, OF LONDON.

PROCESS AND DEVICE FOR THE DIRECT PRODUCTION OF RUBBER SHEETS AND MOLDED ARTICLES FROM LATEX.

Application filed January 26, 1924. Serial No. 688,778.

*To all whom it may concern:*

Be it known that I, PAUL KLEIN, a citizen of Hungary, residing at Budapest, Hungary, have invented certain new and useful Improvements in Processes and Devices for the Direct Production of Rubber Sheets and Molded Articles from Latex, of which the following is a specification.

The present invention relates to a process and apparatus for the direct production of rubber sheets, rubber-coated fabrics, threads, and molded articles from latex.

As is well known rubber, when mechanically treated, loses much in elasticity and tensile strength, so that, for the production of rubber goods, it is desirable to have processes in which the mechanical working of the rubber material is restricted to a minimum or even entirely avoided.

It is known that molded articles can be produced by repeatedly dipping a mold into latex, and drying the thin rubber film precipitated on the mold. Inasmuch, however, as the layers to be obtained by each single dipping are extremely thin, repeated dippings with subsequent drying are necessary for the production of even thin-walled articles, thus entailing a great amount of time, wages, and installation costs, whereby the applicability of this process is greatly reduced.

Now, it is known that rubber can be precipitated from latex at the anode by electrophoresis and, with a sufficiently prolonged action of the current, any desired thickness of the precipitated layer can be obtained in one working operation. The rubber layers precipitated in this way upon the anode, however, have a spongy nature, so that no marketable goods can be produced by this method. The electrophoresis is accompanied by electrolysis, bubbles of oxygen being thereby liberated at the anode, and possibly being the cause of the spongy structure of the rubber precipitate. Accordingly, up to the present, electrophoresis has only been proposed as a substitute for other coagulating means to produce a crude rubber which must be subjected to the usual mechanical treatment, that is to the washing and mixing processes in order to manufacture rubber articles therefrom.

The invention relates to an electrophoretic process for the production of perfectly homogeneous, compact, uniformly smooth and if desired, transparent rubber sheets and molded articles of any thickness, from latex in one working operation without mechanical treatment. Such articles are at least equivalent in appearance to the articles obtained from rubber organosols by dipping, and moreover, in consequence of dispensing with the mastication treatment, the quality is considerably superior.

In the case of articles made from rubber organosols by dipping, according to the ordinary practice, the rubber must be subjected to repeated and drastic mechanical treatment, in consequence of which the original colloidal structure of the rubber suffers extensively. Even in the production of the crude rubber, the coagulated rubber is more or less thoroughly purified by washing, kneading and rolling, and drawn into sheets in rubber mills. These crude rubber sheets are, if necessary, again washed in the works, dried, and for preparing the mixture, are worked in roller mills, after which solution is effected by further treatment in mixing and kneading machines. All these operations impair the nerve of the rubber, and thereby lower the quality of the resulting rubber articles.

It is self-evident that also in dipping in organosols, the dipping and subsequent drying must be frequently repeated, so that a considerable loss in solvents is unavoidable.

According to the invention rubber articles can be produced without any previous mechanical treatment, so that they show an elasticity and tensile strength unattainable in the rubber articles made by the processes hitherto known. The goods can be produced in this process by a single dipping without using solvents.

The new process is based on the circumstance that rubber can be deposited as a homogeneous, thick and smooth layer on the surface of a porous non-conductive base, if a supporting surface consisting of a porous and non-conductive material serving as a backing or mold for the formation of the electrophoretic rubber precipitate is inserted between the anode and cathode, thus allowing the escape of the gases liberated at the anode either through the pores of said backing or mold alone or, where there is an intervening space between said backing and the anode, also through a body of electrolyte filling such intervening space. After removal from the bath and drying, said rubber layer is no longer peptisable when once dried and forms a transparent, homogeneous rubber skin of high elasticity and tensile strength. The expression "non-conductive" as used above is not intended to imply that the substance of the backing is necessarily an absolute non-conductor of electricity but merely that the resistance of the substance of said permeable backing, when permeated with liquid electrolyte, is greater than the resistance of the electrolyte filling the pores of the backing, so that the current passes mainly through the electrolyte and not through the substance of the backing. The action of the new process is probably due to the circumstance that the oxygen or other gases evolved at the anode can escape freely from the liquid layer between the precipitation surface and the anode, and thus the homogeneity of the rubber skin is not affected thereby. This coagulated but still undried rubber layer, does not stop the electrophoretic action but appears to act electro-osmotically in the same sense as the porous precipitation supporting member, so that the ions can continue to be driven through the already precipitated rubber layer.

If perfectly clear rubber skins or articles are to be produced, the latex is first subjected to purification, if desired also to concentration, for example, by centrifuging.

If desired the purified latex may be vulcanized in any well known manner before electrophorizing. Moreover, it is advantageous to add a preservative agent which impedes coagulation, for example 0.5% of ammonia, to the original or concentrated rubber latex which is to be treated by the new process.

The precipitation bases or molds may preferably be made, for example of gypsum or unglazed earthenware, whilst the anodes arranged inside the same are made of suitable conducting material; for example, carbon may be employed. However, metallic anodes may also be used, because the metal ions passing into solution also favour the coagulation of rubber.

Hollow bodies may be made in the described manner by embedding electrically conducting anodes in the dipping molds of gypsum, unglazed earthenware or the like. For the purpose of producing a precipitate which is of uniform thickness all over, the cathode must be uniformly distributed around the mold, or the mold and the cathode may be arranged so that they can be moved or rotated in relation to each other according to the shape of the objects to be produced. They may also be given a simultaneous travelling and rotatory motion.

Moreover, continuous webs, such as rubber sheets of any width, length and thickness, may be made by using as the precipitation base, a non-conductive porous drum, dipping and rotating in the latex, and enclosing the conductive anode; the rubber skin precipitated on the drum being removed from that part of the drum which emerges from the bath. The rubber may also be precipitated upon an endless band, which is passed along the porous wall arranged within the bath, and carries the precipitate with it. If this band consists of a length of fibrous material, for example paper, asbestos or fabric, or of a series of threads laid side by side, the precipitate will enter into extremely intimate connection with same, so that fabrics impregnated with rubber can be produced in a far simpler manner, and of much better quality than with the spreading process hitherto used. Compared with the existing process, the advantage is attained that the repeated spreading and the attachment of a rubber layer by friction is obviated, and the desired thickness of layer can be obtained in one working operation. If, however, a band is used to which the rubber does not adhere, for example fabric coated with cellulose acetate varnish, the rubber skin can be detached from this band.

In the drawings, several embodiments of suitable devices for carrying out the process are shown in diagrammatic vertical sections.

Figs. 1 and 2 are two embodiments of a device for the production of hollow articles of rubber.

Figs. 3 and 4 show two embodiments of a device for the production of continuous rubber sheets.

Fig. 5 is a device for coating a fabric with rubber.

Figure 6:
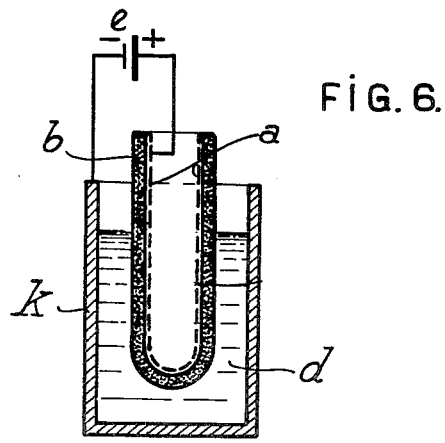
Fig. 6 is a modification of the apparatus shown in Figs. 1 and 2.

In the vessel $c$ (Fig. 1) the mold $b$ of permeable material, for example gypsum, is arranged and the anode $a$, for example of carbon, is embedded therein. $k$ is the cathode, for example of carbon or graphite. The vessel $c$ is filled with latex $d$ purified and concentrated by centrifuging and preferably admixed with a preservative for example 0.5% of ammonia, which prevents coagulation. The anode $a$ is connected to the positive pole and the cathode $k$ to the negative pole of a source of current $e$. The porous mold $b$ absorbs the serum of the latex and becomes electrolytically conductive. The oxygen produced at the anode $a$ after the current is switched on, escapes through the porous gypsum mold $b$, whereas the acid anions formed in a typical instance at the anode by the electrolytic action are driven towards the cathode by electro-endosmosis. Simultaneously in consequence of the cataphoretic action of the electric field, the negatively charged rubber particles of the latex migrate towards the anode, and are pressed against the surface of the permeable gypsum mold inserted between the cathode and anode, where, on meeting the acid driven outwards through the mold $b$, they are coagulated in the form of a homogeneous perfectly smooth layer.

The thickness of the layer increases gradually as long as the current remains switched on. At the beginning, deposition proceeds with great velocity, so that even in a few minutes a thickness of 1 mm. is attained. The rate of deposition, it is true, decreases gradually as the thickness of the layer increases, but nevertheless, very considerable thicknesses can be attained in a comparatively short time. The properties of the deposited layer do not suffer through the alteration in the concentration of the latex cataphoresis and therefore the cataphoresis may be continued to practically complete exhaustion of the latex, that is to say complete deposition of the rubber. It is also possible to provide for the maintenance of the concentration by centrifuging.

The precipitated layer can in some cases still be peptised by reversing the direction of the current. If, however, after a sufficient thickness of the deposit has been attained, the mold is removed from the bath and dried in the air, the rubber is transformed into a modification which can no longer be peptised. The resulting hollow body can be easily detached from the mold.

In the practical carrying out of the invention, when using an anode embedded in gypsum, good results have been obtained with an E. M. F. of 15 volts and a current density of 0.3 amperes per square decimeter. These figures are mentioned merely by way of illustration, however, and are not to be understood as restrictive.

To obtain uniform deposition it is essential that the cathode should surround the mold $b$ on all sides, that is to say, for example, as shown in Fig. 2 where the vessel is made of graphite and itself forms the cathode $k$. For the same purpose, however, the mold $b$ or the anode $a$ carrying same (together with the mold) may be rotated. The relative motion of the mold and the cathode may be both rotatory and translatory. For example, in making rubber tubes, the anodic core may be rotated, whereas the cathode (surrounding said core) in the form of a ring is moved backwards and forwards longitudinally in relation to the core. Thus by keeping the cathode stationary at certain points for a longer time, the walls of the tube may be correspondingly thickened at such points.

Such parts of the porous base as are to be kept free from deposited rubber are provided with an electrically insulating coating impervious to liquids for example of vulcanized, or unvulcanized but dried rubber.

According to Fig. 2, for example, the ring $t$ made of vulcanized rubber, limits the deposition of the rubber in the upward direction.

According to Fig. 1, the anode $a$ is embedded in the porous mold $b$. However, as can be seen from Fig. 2, a chamber $f$ filled with a suitable electrolyte may be inserted between the anode $a$ and the walls of the mold.

For producing continuous lengths of rubber according to Fig. 3, use is made of a rotary drum $b$ of insulating material permeable to liquids (for example, gypsum) dipping into the latex $d$. Inside said drum is contained a suitable electrolyte $f$ together with the anode $a$.

The rubber layer $m$ deposited on the drum is detached from the drum, which rotates in the direction of the arrow, and is led by means of a belt conveyor $n$ to a washing and drying device not shown. In this manner a perfectly homogeneous rubber skin or sheet of any desired thickness may be produced direct from purified and concentrated latex. Instead of one cathode, several may be provided around the immersed part of the drum, as shown at $k$.

Inasmuch as the velocity of the deposition depends on the strength of the current, it is desirable to restrict the resistance of the cell to the minimum, for which reason it is advantageous to keep the thickness of the wall of the porous diaphragm, or the distance of the deposition surface from the anode, as small as possible. For this purpose the porous diaphragm is preferably made as a coating immediately covering the anode. For the purpose of enabling a free escape of the oxygen generated on the anode, the anode has to be perforated as finely as possible, and consequently it either consists of a closely perforated sheet metal or preferably of wire gauze.

Fig. 4 shows, for example, a drum consisting of a perforated sheet metal or wire gauze cylinder $a$, provided with a porous non-conductive coating $b$, for example of gypsum, Portland cement mortar, or of fibrous materials, for example asbestos, parchment paper or hydrocellulose and the like.

Moreover, in this embodiment an endless permeable band $p$ is led over the drum $b$, said band consisting for example of fabric coated with a cellulose varnish upon which the deposition of the rubber is effected in such a manner that the rubber layer $m$ can be removed.

Fig. 6 shows a modification of the device shown in Fig. 2 in which a perforated metal or wire gauze cylinder $a$ is placed within the thin-walled porous hollow mold and forms the anode.

In the embodiments shown in Figs. 4 and 6 the oxygen liberated on the anode escapes through the holes (interstices) of the anode.

The process may also be applied to the production of rubber coated fabrics or paper or other fibrous or porous materials as shown in Fig. 5, in which the anodic diaphragm, instead of having the shape of a rotary drum, is constructed in the shape of a stationary plate $b$ in which are embedded the carbon rods $a$ serving as anodes. At the bottom of the vessel $c$, is arranged the cathode $k$. The band of paper or fabric $s$ which is to be coated with rubber is passed along the lower surface of the sheet $b$, and fabric or paper band $s'$ leaving the bath coated with rubber is then led away for drying or further treatment.

If the rubber should penetrate through the fabric and be deposited onto the base $b$, an endless band of parchment or the like may be led together with the fabric to be impregnated between said fabric $s$ and the base $b$.

Figure 7:
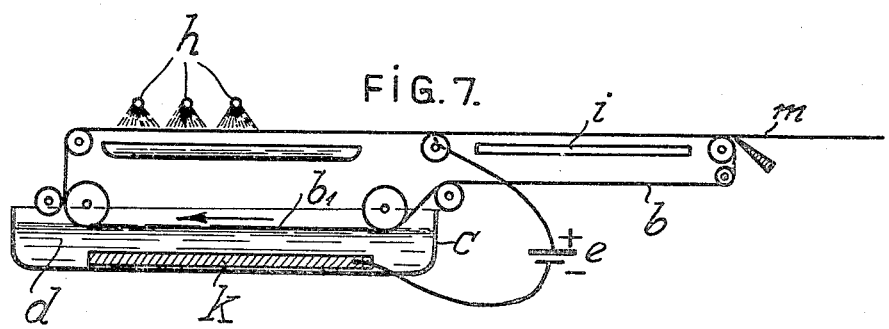
Figs. 7 and 8 show two embodiments of an apparatus for manufacturing continuous rubber sheets with an endless flexible band serving as precipitation base.
Figure 8:
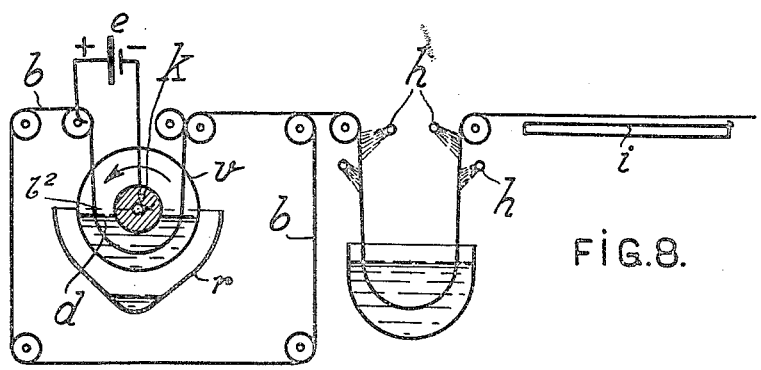

Figs. 7 and 8 show modifications of the apparatus in which the base of precipitation consists of wire gauze provided with a flexible porous non-conducting coating. This latter can be obtained, for example, by coating the wire gauze with paper pulp and by hydratizing the paper coating in order to transform it into parchment. The wire gauze may be, however, coated also with cellulose varnish.

Fig. 7 shows an endless depositing base $b$ (prepared in the above described manner) which is conducted over rollers in such a way that a horizontal track $b'$ of considerable length may be formed in the neighbourhood of the surface of the latex bath. Underneath the horizontal track $b'$ of the band a cathode $k$ is arranged on the bottom of the receptacle $c$. The part of the band covered with rubber deposit emerging from the bath is conducted to washing showers $h$ and over a drying table $i$ after which the rubber deposit $m$ is removed from the band $b$.

Fig. 8 shows an arrangement in which the depositing band $b$ forms a loop $b^2$ serving as a trough for the reception of the concentrated latex $d$. Within the trough $b^2$ there is located a cylindrical cathode $k$, being provided at both its ends with discs $v$ of non-conducting material, for example rubber, closing the trough at its two ends. The latex escaping in spite of it will be collected in a trough $r$.

It is also possible to provide molded rubber articles with an insertion or facing of fabric by the new process, by bringing the shaped fabrics into position on the porous molds connected up as anodes.

For the purpose of obtaining perfect articles, it is necessary that the latex has been treated by centrifuging before being submitted to cataphoresis. The centrifuging frees the latex, which has been stabilized by adding a preservative agent for example 0.5% of ammonia, from solid impurities and most of the resinous constituents, but still leaves a sufficient content of liquid for the cataphoretic process.

In the above described manner transparently coloured rubber goods also may be produced without any mechanical treatment at all. For this purpose the latex from which the goods are to be produced according to the invention receives an addition of organic dyes the particles of which in the hydrosol state exhibit a negative charge. Such dyes are adsorbed by the rubber particles without producing coagulation, and on centrifuging, they enter the concentrate, whilst the unadsorbed parts of the dye remain in the serum or enter the sludge separated by the centrifuge.

From this purified and dyed rubber latex the dye which has been adsorbed by the rubber particles during electrophoresis is deposited therewith in the rubber skin and furnishes perfectly uniform transparently coloured articles.

Moreover, sulphur and various known rubber adjuncts, such as filling materials, solid and liquid accelerators, oils and the like, may be incorporated with the articles produced according to the new process, without any mechanical treatment of the rubber whatsoever, by mixing such substances in a colloidal or finely dispersed state with the latex, and subjecting them to electrophoresis, for the purpose of producing articles in the above described manner. In using adjuncts, the particles of which in aqueous dispersion exhibit a negative charge, a homogeneous rubber mixing is obtained by cataphoretic deposition.

The vulcanization of the goods produced in accordance with the new process is effected in known manner. The term rubber includes any substances alike to caoutchouc, such as guttapercha, balata and the like.

What is claimed is:—

1. The process which consists in electrophoretically precipitating the rubber from rubber-latex upon a supporting member of electrically non-conductive porous material and containing within it the anode, the precipitating surface of said supporting member being thereby separated from the anode by a layer allowing the escape of the gases liberated at the anode and containing an electrolyte, which coagulates latex.

2. The process which consists in electrophoretically precipitating the rubber from rubber-latex upon a mold consisting of an electrically non-conductive porous material and containing within it the anode, the precipitating surface of said mold being thereby separated from the anode by a layer allowing the escape of the gases liberated at the anode and containing an electrolyte.

3. The process which consists in electrophoretically precipitating the rubber from rubber-latex substantially freed from impurities upon a supporting member of electrically non-conductive porous material and containing within it the anode, the precipitating surface of said supporting member being thereby separated from the anode by a layer allowing the escape of the gases liberated at the anode and containing an electrolyte.

4. The process which consists in electrophoretically precipitating the rubber from rubber-latex substantially freed from impurities upon a mold consisting of an electrically non-conductive porous material and containing within it the anode, the precipitating surface of said mold being thereby separated from the anode by a layer allowing the escape of the gases liberated at the anode and containing an electrolyte.

5. The process which consists in electrophoretically precipitating the rubber from rubber-latex substantially freed from impurities and concentrated by centrifuging upon a supporting member of electrically non-conductive porous material and containing within it the anode, the precipitating surface of said supporting member being thereby separated from the anode by a layer allowing the escape of the gases liberated at the anode and containing an electrolyte.

6. The process which consists in electrophoretically precipitating the rubber from rubber-latex substantially freed from impurities and concentrated by centrifuging upon a mold consisting of an electrically non-conductive porous material and containing within it the anode, the precipitating surface of said mold being separated from the anode by a layer allowing the escape of the gases liberated at the anode and containing an electrolyte.

7. The process which consists in electrophoretically precipitating the rubber from rubber-latex upon a supporting member of electrically non-conductive porous material and containing within it the anode, the precipitating surface of said supporting member being thereby separated from the anode by a layer allowing the escape of the gases liberated at the anode and containing an electrolyte, the said supporting member and the cathode being moved in relation to each other during the electrophoretic precipitation of the rubber.

8. The process which consists in electrophoretically precipitating the rubber from rubber-latex substantially freed from impurities upon a supporting member of electrically non-conductive porous material and containing within it the anode, the precipitating surface of said supporting member being thereby separated from the anode by a layer allowing the escape of the gases liberated at the anode and containing an electrolyte, the said supporting member and the cathode being moved in relation to each other during the electrophoretic precipitation of the rubber.

9. The process which consists in electrophoretically precipitating the rubber from rubber-latex substatially freed from impurities and concentrated by centrifuging upon a supporting member of electrically non-conductive porous material and containing within it the anode, the precipitating surface of said supporting member being thereby separated from the anode by a layer allowing the escape of the gases liberated at the anode and containing an electrolyte, the said supporting member and the cathode being moved in relation to each other during the electrophoretic precipitation of the rubber.

10. The process which consists in electrophoretically precipitating the rubber from rubber-latex upon a supporting member of electrically non-conductive porous material and containing within it the anode, the precipitating surface of said supporting member being thereby separated from the anode by a layer allowing the escape of the gases liberated at the anode and containing an electrolyte, the said supporting member and the cathode being moved in relation to each other during the electrophoretic precipitation of the rubber in such an irregular manner that the cathode lingers longer at points where greater thickness of deposition is required than at points requiring smaller thickness.

11. The process which consists in electrophoretically precipitating the rubber from rubber-latex substantially freed from impurities upon a supporting member of electrically non-conductive porous material and containing within it the anode, the precipitating surface of said supporting member being thereby separated from the anode by a layer allowing the escape of the gases liberated at the anode and containing an electrolyte, the said supporting member and the cathode being moved in relation to each other during the electrophoretic precipitation of the rubber in such an irregular manner that the cathode lingers longer at points where greater thickness of deposition is required than at points requiring smaller thickness.

12. The process which consists in electrophoretically precipitating the rubber from rubber-latex substantially freed from impurities and concentrated by centrifuging upon a supporting member of electrically non-conductive porous material and containing within it the anode, the precipitating surface of said supporting member being thereby separated from the anode by a layer allowing the escape of the gases liberated at the anode and containing an electrolyte, the said supporting member and the cathode being moved in relation to each other during the electrophoretic precipitation of the rubber in such an irregular manner that the cathode lingers longer at points where greater thickness of deposition is required than at points requiring smaller thickness.

13. The process which consists in electrophoretically precipitating the rubber from vulcanized rubber latex upon a supporting member of electrically non-conductive porous material and containing within it the anode, the precipitating surface of said supporting member being thereby separated from the anode by a layer allowing the escape of the gases liberated at the anode and containing an electrolyte.

14. The process which consists in electrophoretically precipitating the rubber from vulcanized rubber latex upon a mold consisting of an electrically non-conductive porous material and containing within it the anode, the precipitating surface of said mold being thereby separated from the anode by a layer allowing the escape of the gases liberated at the anode and containing an electrolyte.

15. The process which consists in electrophoretically precipitating the rubber from vulcanized rubber latex substantially freed from impurities upon a supporting member of electrically non-conductive porous material and containing within it the anode, the precipitating surface of said supporting member being thereby separated from the anode by a layer allowing the escape of the gases liberated at the anode and containing an electrolyte.

16. The process which consists in electrophoretically precipitating the rubber from vulcanized rubber latex substantially freed from impurities upon a mold consisting of an electrically non-conductive porous material and containing within it the anode, the precipitating surface of said mold being thereby separated from the anode by a layer allowing the escape of the gases liberated at the anode and containing an electrolyte.

17. The process which consists in adding materials to be incorporated into the rubber articles to be manufactured in a finely dispersed state to the latex and in electrophoretically precipitating the rubber particles with the particles of the additional materials joined to the rubber particles upon a supporting member of electrically non-conductive porous material and containing within it the anode, the precipitating surface of said supporting member being thereby separated from the anode by a layer allowing the escape of the gases liberated at the anode and containing an electrolyte.

18. The process which consists in adding materials to be incorporated into the rubber articles to be manufactured in a colloidal state to the latex and in electrophoretically precipitating the rubber particles with the particles of the additional materials joined to the rubber particles upon a supporting member of electrically non-conductive porous material and containing within it the anode, the precipitating surface being thereby separated from the anode by a layer allowing the escape of the gases liberated at the anode and containing an electrolyte.

19. The process which consists in adding materials to be incorporated into the rubber articles to be manufactured in finely dispersed state to the latex, in removing the excess, and in electrophoretically precipitating the rubber particles with the materials, upon a supporting member of electrically nonconductive porous material and containing within it the anode, the precipitating surface of said supporting member being thereby separated from the anode by a layer allowing the escape of the gases liberated at the anode and containing an electrolyte.

20. The process which consists in adding dyes to be incorporated into the rubber articles to be manufactured in colloidal state to the latex, in removing the excess, and in electrophoretically precipitating the rubber particles with the dyes upon a supporting member of electrically non-conductive porous material and containing within it the anode, the precipitating surface of said supporting member being thereby separated from the anode by a layer allowing the escape of the gases liberated at the anode and containing an electrolyte.

21. The process which consists in adding sulphur to be incorporated into the rubber articles to be manufactured in a finely dispersed state to the latex, and in electrophoretically precipitating the rubber particles with the sulphur upon a supporting member of electrically non-conductive porous material and containing within it the anode, the precipitating surface of said supporting member being thereby separated from the anode by a layer allowing the escape of the gases liberated at the anode and containing an electrolyte.

22. The process which consists in electrophoretically precipitating the rubber from rubber-latex upon porous materials placed upon a supporting member of electrically non-conductive porous material and containing within it the anode, the precipitating surface of said supporting member being thereby separated from the anode by a layer allowing the escape of the gases liberated at the anode and containing an electrolyte.

23. The process which consists in electrophoretically precipitating the rubber from rubber-latex upon fibrous materials placed upon a supporting member of electrically non-conductive porous material and containing within it the anode, the precipitating surface of said supporting member being thereby separated from the anode by a layer allowing the escape of the gases liberated at the anode and containing an electrolyte.

24. The process which consists in electrophoretically precipitating the rubber from rubber-latex upon a fabric placed upon a supporting member of electrically non-conductive porous material and containing within it the anode, the precipitating surface of said supporting member being thereby separated from the anode by a layer allowing the escape of the gases liberated at the anode and containing an electrolyte.

25. The process which consists in electrophoretically precipitating the rubber from rubber-latex upon a fabric covering a mold of electrically non-conductive porous material and containing within it the anode, the precipitating surface of said mold being thereby separated from the anode by a layer allowing the escape of the gases liberated at the anode and containing an electrolyte.

26. The process which consists in electrophoretically precipitating the rubber from rubber-latex upon a fabric moved between a cathode and a supporting member of non-conductive porous material and containing within it the anode, the precipitating surface of said supporting member being thereby separated from the anode by a layer allowing the escape of the gases liberated at the anode and containing an electrolyte.

27. The process which consists in electrophoretically precipitating the rubber from rubber-latex upon a supporting member of electrically non-conductive porous material and provided with a perforated anode on that side of said member which is away from the cathode and is immersed in an electrolyte.

28. A homogeneous dense rubber article having a thickness exceeding the thickness obtainable by a single dipping in a rubber solution and having the native colloidal structure of coagulated rubber.

29. A homogeneous dense rubber shape having a thickness exceeding the thickness obtainable by a single dipping in a rubber solution and having the native colloidal structure of coagulated rubber.

30. A homogeneous dense rubber article having a thickness exceeding the thickness obtainable by a single dipping in a rubber solution, containing additional substances and having the native colloidal structure of coagulated rubber.

31. Depositing mold for the manufacture of homogeneous rubber articles from latex consisting of porous electrical non-conductors with embedded electrically conductive armatures, adapted to be connected to a source of current.

32. Depositing mold for the manufacture of homogeneous rubber-articles from latex consisting of a perforated metallic backing adapted to be connected to a source of current and provided with an electrically non-conducting coating permeable to liquids.

33. Depositing mold for the manufacture of homogenous rubber-articles from latex consisting of a wire fabric adapted to be connected to a source of current and provided with an electrically non-conducting coating permeable to liquids.

34. In an apparatus of the kind described an endless member of electrically non-conductive material permeable to liquids, an electrode arranged opposite said member, another electrode arranged on the side of the said member away from the said first electrode and means to feed a rubber emulsion between the surface of the said member and the said first electrode.

35. The process of manufacturing homogenous rubber goods direct from rubber-latex, which comprises electrophoretically precipitating rubber from latex in predetermined desired form adjacent to but substantially out of direct contact with a suitable electrode, whereby gases liberated at said electrode may escape without passing through the precipitated rubber, and then treating the precipitated rubber to render the same non-peptisable.

36. The process of manufacturing homogeneous rubber goods direct from rubber-latex, which comprises subjecting latex to the action of an electric current passing between electrodes to which proper voltage is applied to electrophoretically precipitate rubber from the latex in predetermined form upon a supporting surface or backing, which surface or backing separates the receiving electrode from the deposited rubber and thereby provides opportunity for the escape, between said electrode and said precipitated rubber, of gases liberated at said electrode, and then subjecting the precipitated rubber in said predetermined form to appropriate treatment adapted to render the same non-peptisable.

37. The process as defined in claim 36, further characterized by the fact that said support or backing is composed of permeable non-conductive material and provides, by reason of its own porosity, opportunity for escape of said liberated gases.

38. The process as defined in claim 36, further characterized by the fact that said support or backing is composed of porous non-conductive material and provides, by reason of its own porosity, opportunity for escape of said liberated gases, and by the fact that said precipitated rubber is dried to render the same non-peptisable.

In testimony whereof I affix my signature in presence of two witnesses.

Dr. PAUL KLEIN.

Witnesses:
  EUGENE HANRANY,
  CHARLES MEDGYE.